United States Patent [19]

Buennagel

[11] Patent Number: 4,589,075
[45] Date of Patent: May 13, 1986

[54] REMOTE LOAD DATA ACQUISITION AND CONTROL SYSTEM FOR A POWER NETWORK

[76] Inventor: James A. Buennagel, 2228 N. Lesley, Indianapolis, Ind. 46218

[21] Appl. No.: 469,083

[22] Filed: Feb. 23, 1983

[51] Int. Cl.⁴ .................. H04B 7/24; H04Q 9/00; G05F 1/66

[52] U.S. Cl. .................. 364/492; 179/2 EC; 340/310 A; 340/825.69

[58] Field of Search ......... 340/825.06, 310 A, 825.69; 455/7, 17, 18, 22; 179/2 EB, 2 DP, 2 EC; 364/493, 492

[56] References Cited

U.S. PATENT DOCUMENTS

| | | | |
|---|---|---|---|
| 2,955,279 | 10/1960 | Bode et al. | 179/2 EC |
| 3,942,170 | 3/1976 | Whyte | 340/310 A |
| 3,967,264 | 6/1976 | Whyte et al. | 340/310 A |
| 4,023,043 | 5/1977 | Stevenson | 364/493 |
| 4,125,808 | 11/1978 | Graham | 455/7 |
| 4,127,845 | 11/1978 | Dansbach et al. | 340/825.06 |
| 4,130,874 | 12/1978 | Pai | 364/514 |
| 4,190,800 | 2/1980 | Kelly, Jr. et al. | 340/310 A |
| 4,199,761 | 4/1980 | Whyte et al. | 340/310 R |
| 4,210,901 | 7/1980 | Whyte et al. | 340/310 R |
| 4,250,489 | 2/1981 | Dudash et al. | 340/825.02 |
| 4,264,960 | 4/1981 | Gurr | 364/492 |
| 4,337,376 | 6/1982 | Gruenberg | 455/17 |
| 4,427,968 | 1/1984 | York | 340/310 A |
| 4,454,509 | 6/1984 | Buennagel et al. | 364/492 |
| 4,467,314 | 8/1984 | Weikel et al. | 340/310 A |

Primary Examiner—Felix D. Gruber
Attorney, Agent, or Firm—Woodard, Weikart, Emhardt & Naughton

[57] ABSTRACT

A load management system for a power network which both addresses remote load controllers and acquires load data through a retransmission network. A central controller processes power load a data and generates digital messages which address loads and command the selective connection and disconnection of loads. The central controller transmits the generated digital messages via radio frequency transmissions. Programmable retransmission stations receive, decode and directionally retransmit the digital messages. Addressable remote load controllers receive and decode transmitted digital messages and operate to connect and disconnect loads in response to command messages received by the addressed load controllers. Addressable data acquisition units sense loads at points in the power network and operate to generate digital load data messages. Retransmission stations receive load data messages from the addressable data acquisition units and retransmit load data messages through the retransmission network to the central controller. Yet other digital messages are translated into paging signals and disseminated to remote paging units.

5 Claims, 15 Drawing Figures

REMOTE LOAD DATA ACQUISITION AND CONTROL SYSTEM FOR A POWER NETWORK

FIELD OF THE INVENTION

The field of the invention is load management systems. More particularly, the field of the invention is load management systems for a power network which utilize remote load data.

BACKGROUND OF THE INVENTION

The power systems of electrical power companies regularly encounter periods of peak load demand. During these periods the power drain placed upon the power system is significantly higher than average. It is excessively costly to maintain the supply of power during peak load periods. Electrical power production is most inefficient during these periods. Moreover, there is added cost in the construction of power generating facilities as they must be built to accommodate maximum power consumption. Failure to meet peak demands can result in power failure or blackout.

Significant overall savings can be obtained where peak power demands are reduced and spread out over a period of time. To achieve this result, load management systems monitor the power supply and demand and selectively turn off deferrable loads, such as water heaters and air conditioners, during peak load periods to evenly distribute the power demand over time. In a typical load management system, remote load controllers are addressed by omnidirectional radio transmissions from a central unit. Transmissions are received and decoded by the remote controller units which selectively control the functions of particular loads in response to the commands transmitted by the central unit. Power consumption is monitored at various points in the power network and the load data acquired is relayed to the central control unit via telephone lines. Such systems in the prior art are limited in their capacity to efficiently cover some power networks where the central control unit is not centrally located or where the network has an elongated configuration and by the availability and high cost of phone lines in remote regions.

SUMMARY OF THE INVENTION

In general terms, the present invention relates to a power management system for a power network which both addresses remote load controllers and acquires load data through a directional retransmission network. In one embodiment, a central controller processes power load data and generates digital messages which address loads and command the selective connection and disconnection of loads. The central controller transmits the generated digital messages via radio frequency transmissions. Programmable retransmission stations receive, decode, and directionally retransmit the digital messages. Addressable remote load controllers receive and decode transmitted digital messages and operate to connect and disconnect loads in response to command messages received by the addressed load controllers. In response to other digital messages, addressable data acquisition units sense loads at points in the power network and operate to generate digital load data messages. Retransmission stations receive load data messages from the addressable data acquisition units, retransmit load data messages through the retransmission network to the central controller. Yet other digital messages are translated into paging signals and disseminated to remote paging units.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
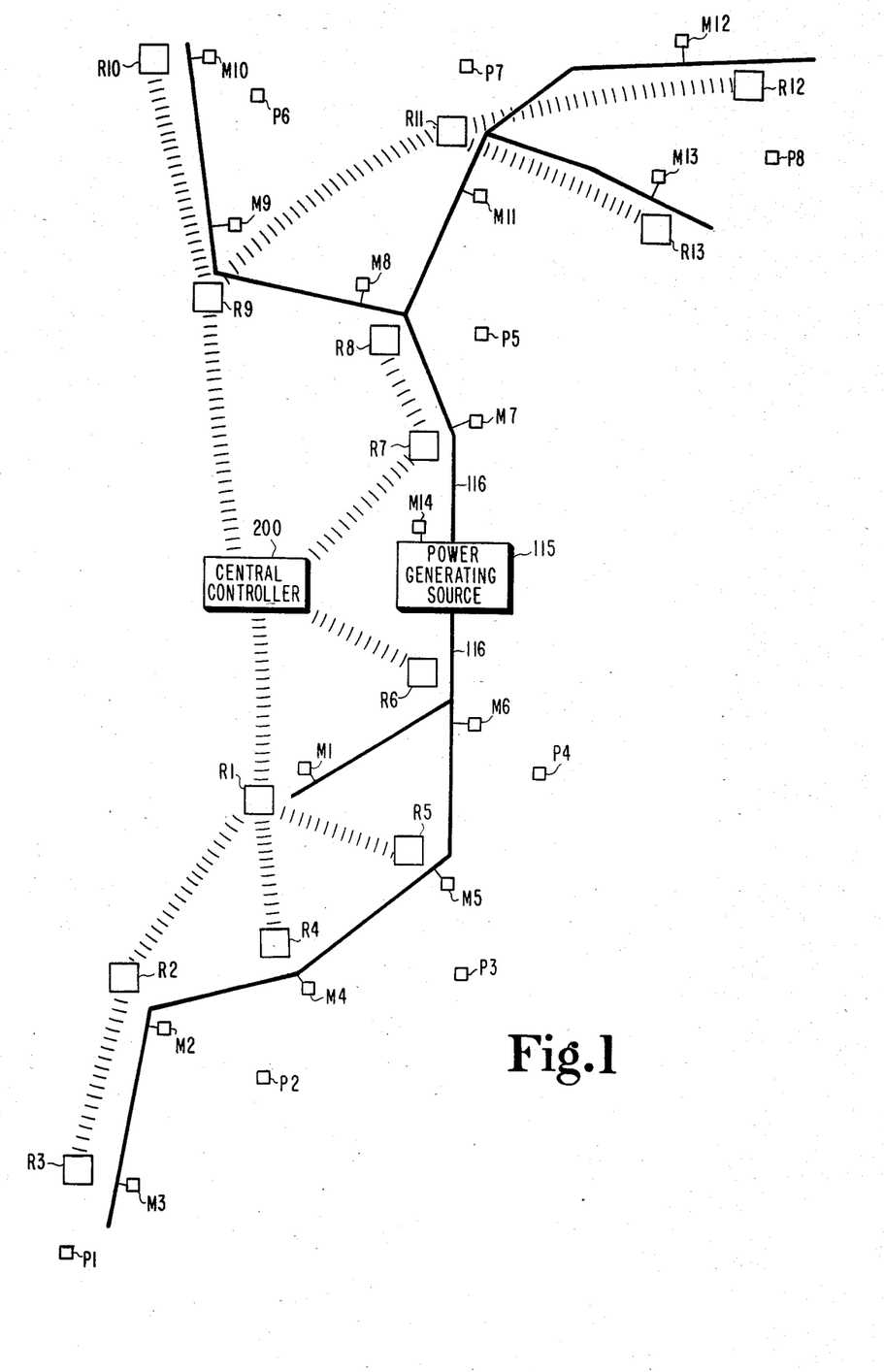
FIG. 1 is a diagram of a load management system for a power network. Specific addressable, remotely controllable loads have not been shown in FIG. 1.

Referring now to the drawings, FIG. 1 shows an electrical power network and load management system embodying the present invention. The power network includes power generating source 115, power distribution lines 116, and power loads (not shown). Power distribution lines 116 carry electrical power supplied by power generating source 115 to the power loads. The power loads are selectively connectable to the power network to draw electrical power from power generating source 115. At least some of the power loads are addressable and remotely controllable loads. These remotely controllable loads include deferrable loads which are remotely controlled by central controller 200 to more evenly distribute the power demand during peak load periods.

Central controller 200 both controls the remotely controllable loads and accesses power load data via a network of directional retransmission stations R1–R12. Retransmission stations R1–R12 (1) receive and retransmit load command, load data access command, and paging information through the retransmission network to the point of dissemination, (2) disseminate load command information to target controllable loads, (3) disseminate load data access commands to target load monitors M1–M14, (4) receive and retransmit load data to central controller 200, and (5) disseminate paging transmissions to remote paging units P1–P8.

Figure 2:
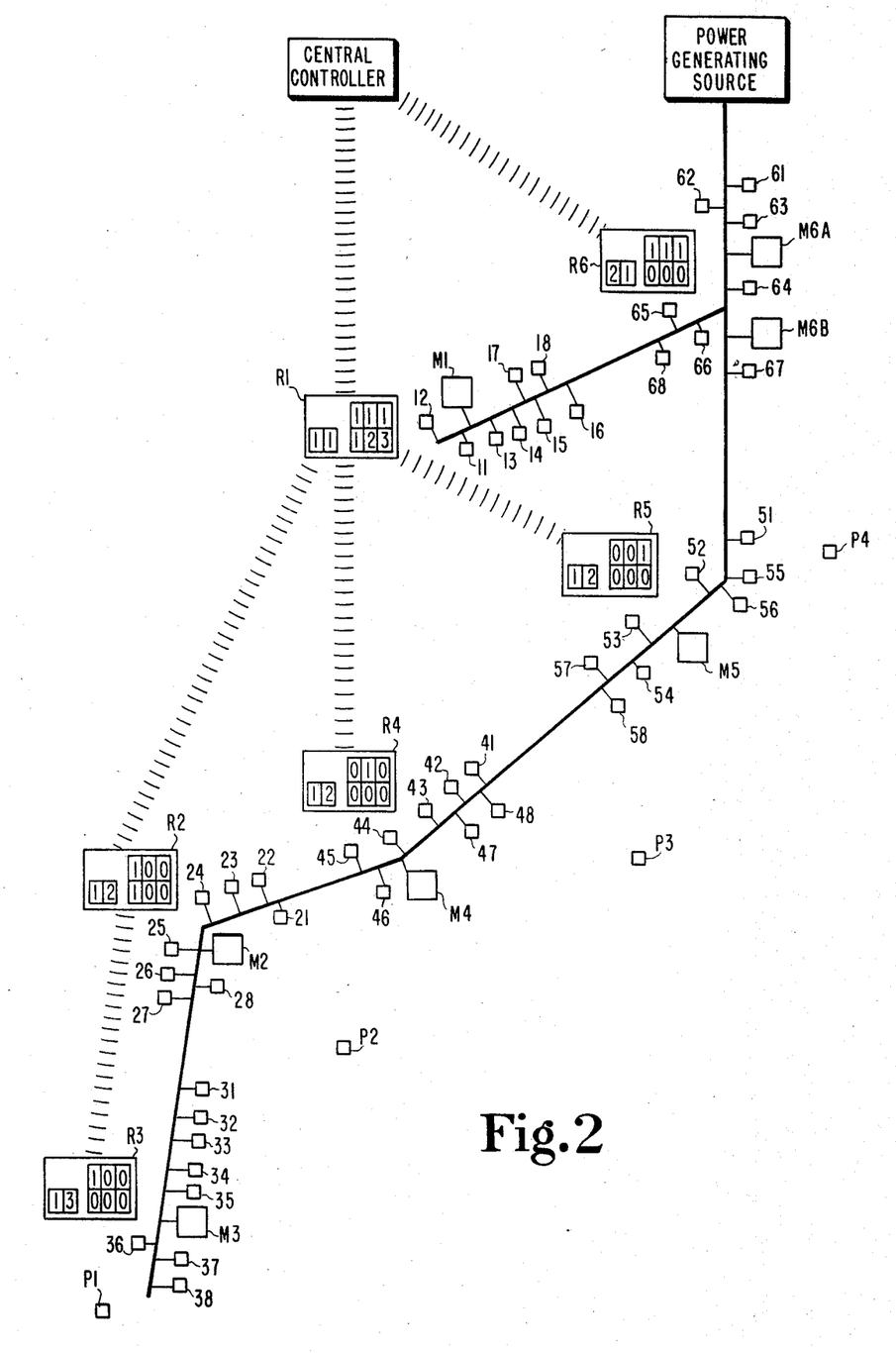
FIG. 2 is a diagram of a portion of the load management system and power network of FIG. 1, additionally illustrating the connection of addressable, remotely controllable loads to the power network and the selective preprogramming of the retransmission stations.

FIG. 2 shows a portion of the power network and load management system of FIG. 1, additionally showing the connection of addressable, remotely controllable loads 11–69 and the selected coding of retransmission stations R1–R6. The specific dip switch settings for retransmission stations R1–R6 determine their relation in the retransmission network, as will be more fully described.

Figure 3:
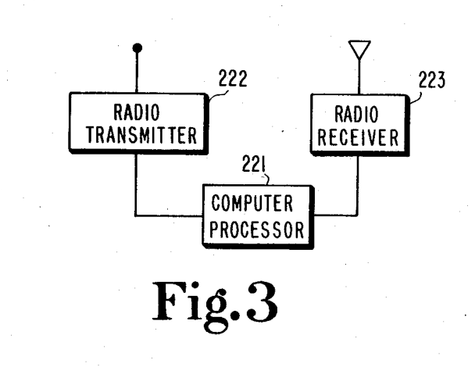
FIG. 3 is a diagram of a central controller of FIGS. 1 and 2.

Referring now to FIG. 3, central controller 200 includes computer processor 221, radio transmitter 222, and radio receiver 223. Computer processor 221 processes power network supply and load data and generates digital messages. The digital messages generated by computer processor 221 (1) address loads in the power system to command the connection and disconnection of addressed loads to and from the power generating source, (2) address load monitors for load data acquisition, and (3) address remote paging units. Radio transmitter 222 transmits the digital messages generated by processor 221 into the retransmission network. Radio receiver 223 receives radio frequency messages from the retransmission network and relays received messages to processor 221. The received messages include load data messages generated by remote load monitors in response to previously generated load data acquisition messages. The particular specifications of transmitter 222 and receiver 223 are a matter of personal preference, are well within the skill of the art, are not a part of the present invention, and will therefore not be described in further detail. Similarly, the specific operation of control by processor 221, i.e. the decision making process as to the connection and disconnection of the remote loads, the accessing of the remote load monitors, and the paging of the remote pages, do not form a part of the present invention. However, the formatting of the messages generated and received by processor 221 and the functioning of these messages within the retransmission network will be described in specific detail as they relate to the invention being claimed.

Figure 4:
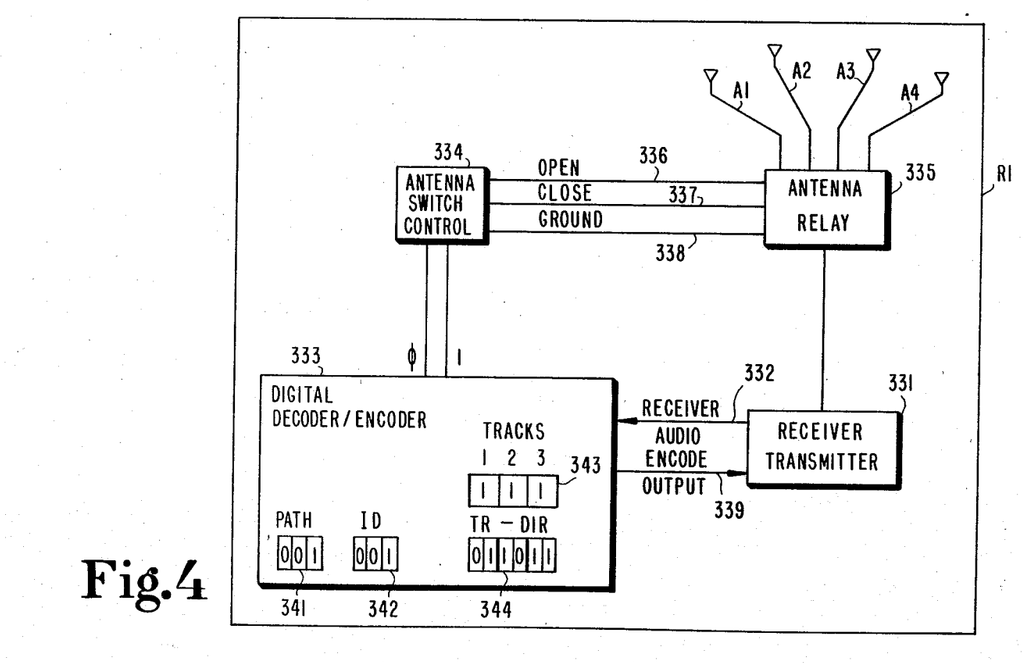
FIG. 4 is a diagram of a retransmission station of FIGS. 1 and 2.

FIG. 4 is a diagram of retransmission station R1 as an example of one of the retransmission stations in the retransmission network. Receiver/transmitter 331 receives and transmits radio signals via directional antennas A1, A2, A3, and A4. Received signals are relayed to digital decoder/encoder 333 (line 332). Digital decoder/encoder 333 includes means for decoding received radio signals into digital messages and for processing the decoded messages. Digital decoder/encoder 333 also includes means for controlling the connection of specific directional antennas A1, A2, A3, and A4 to receiver/transmitter 331 via antenna switch control 334, which in turn operates to open and close antenna relay 335 (lines 336, 337, and 338). As will be more fully described later, digital decoder/encoder 333 is selectively pre-coded by dip switch packages 341, 342, 343, and 344 for desired field operation in the retransmission network. After processing digital messages received, digital decoder/encoder 333 encodes digital messages into audio for transmission by receiver/transmitter 331.

Figure 5:
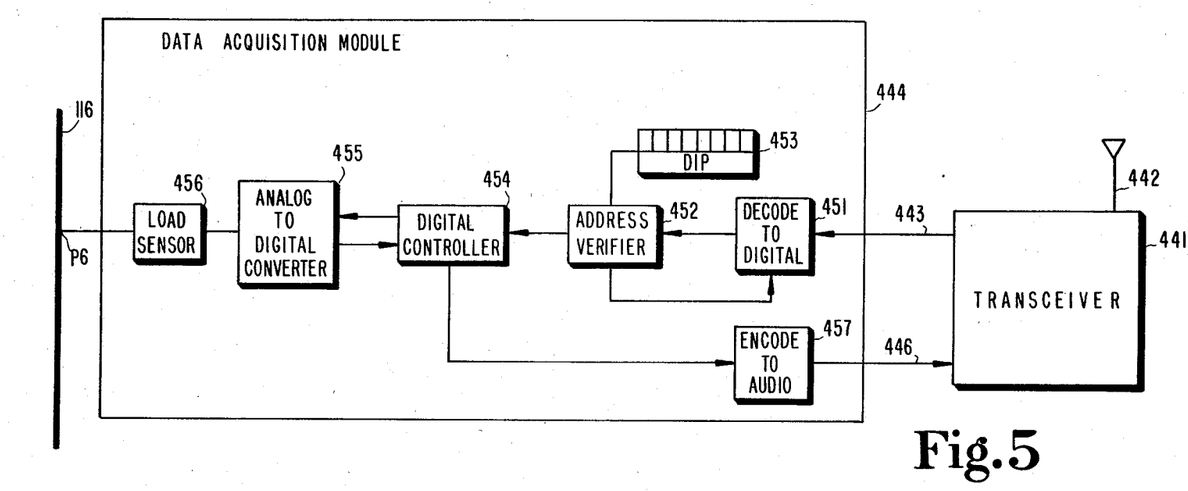
FIG. 5 is a diagram of a load data acquisition monitor of FIGS. 1 and 2.

FIG. 5 is a diagram of power load monitor M6 as an example of one of the remote load monitors in the retransmission network. Radio messages received by transceiver 441 (through antenna 442) are relayed to data acquisition module 444 (line 443). Data acquisition module 444 monitors the load on power network at point 6. Data acquisition monitor 444 decodes received messages into digital format (box 451). Received digital messages are compared (box 452) to a pre-programmed address (dip switch package 453). Upon receipt of the appropriately addressed transmission, digital controller 454 accesses analog to digital converter 455 which generates a digital number corresponding to the load sensed at point 6 by load sensor 456. The sensed load data is converted into audio (box 457) and conveyed to transceiver 441 (line 446) for radio transmission. The preferred source code for data acquisition module 444 has been submitted as Exhibit A.

Figure 6:
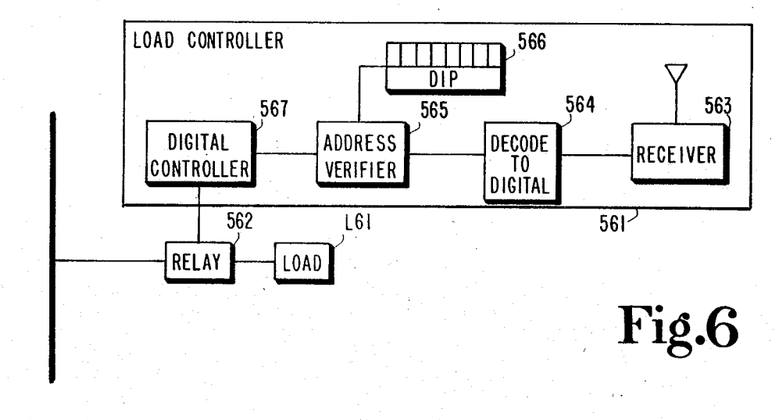
FIG. 6 is a diagram of an addressable, remotely controllable load of FIG. 3.

FIG. 6 is a diagram of addressable, remotely controllable load circuit 61, as an example of one of the remotely controllable load circuits in the retransmission network. Load L61 is connected to power generating source 115 through relay 562 and power line 116. Load controller 561 receives radio transmissions through receiver 563, and decodes the received transmissions into digital data (box 564). Received digital messages are compared (box 565) to a pre-programmed address (dip switch package 566). Digital controller 567 selectively connects and disconnects load L61 to and from power generating source 115 by closing and opening relay 562 in response to appropriate received and addressed messages.

As mentioned above, load controllers for loads 11–69 in the power network each has an address identifier (i.e. dip switch package 566) which need not be distinct, and responds to command messages when it receives and decodes the address identifier of that load controller. Load control data words are divided into two groups, zone identifier words, and command/address words. Zone code and command/address formatting is performed in the manner described in U.S. Pat. No. 4,352,992 to Buennagel and Koch, issued on Oct. 5, 1982, which is hereby incorporated by reference. Addressing of the power load monitors M1–M14 is formatted in the same manner.

Figure 7A:
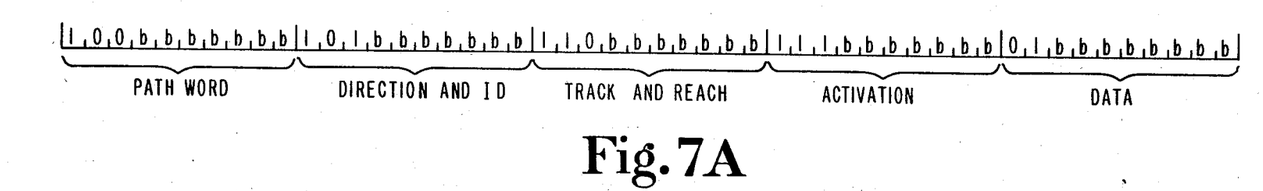
FIGS. 7A and 7B illustrate the transmission format for control and data words used by the retransmission network of FIGS. 1–6.
Figure 7B:
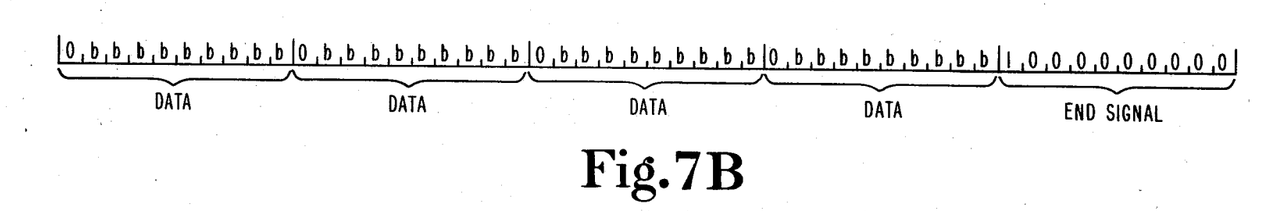

Retransmission stations R1–12 receive operating instructions and addressing information from a group a five control words (FIGS. 8A–8E) that are transmitted as a part of a load control data group (FIGS. 7A and 7B). Each word consists of ten bits of data. The data is generated by a sequence of tone bursts. The first burst is always one of two tone frequencies (initial tone pair). The next nine tone bursts alternate between nonharmonic tone pairs. Regarding transmission formatting and signal reception, reference is hereby made to U.S. Pat. No. 4,352,992 to Buennagel and Koch, issued on Oct. 5, 1982, which has been incorporated herein.

Figure 8A:
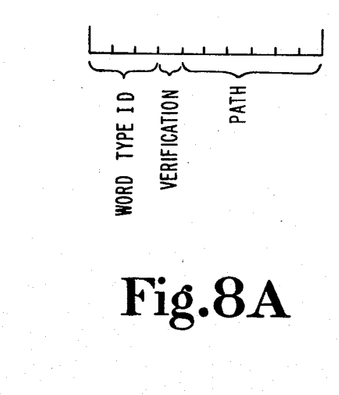
FIG. 8A more specifically shows the format of the first control data word (path) in the transmission format of FIG. 7A.
Figure 8B:
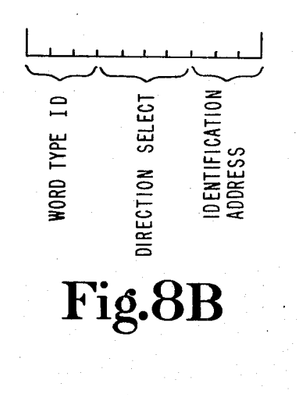
FIG. 8B more specifically shows the format of the second control data word (directing and identification) in the transmission format of FIG. 7A.
Figure 8C:
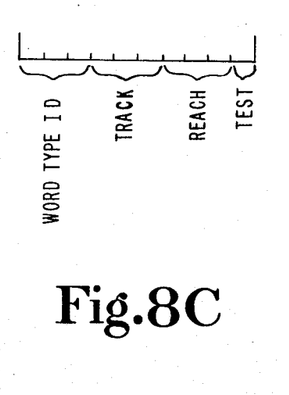
FIG. 8C more specifically shows the format of the third control data word (track and reach) in the transmission format of FIG. 7A.
Figure 8D:
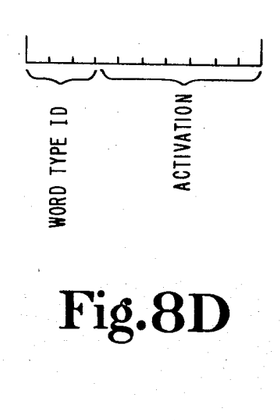
FIG. 8D more specifically shows the format of the fourth control data word (activation) in the transmission format of FIG. 7B.
Figure 8E:
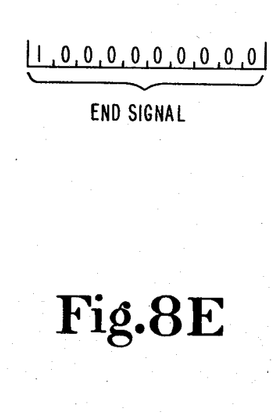
FIG. 8E more specifically shows the format of the last control data word (end signal) in the transmission format of FIG. 7B.
Figure 9:
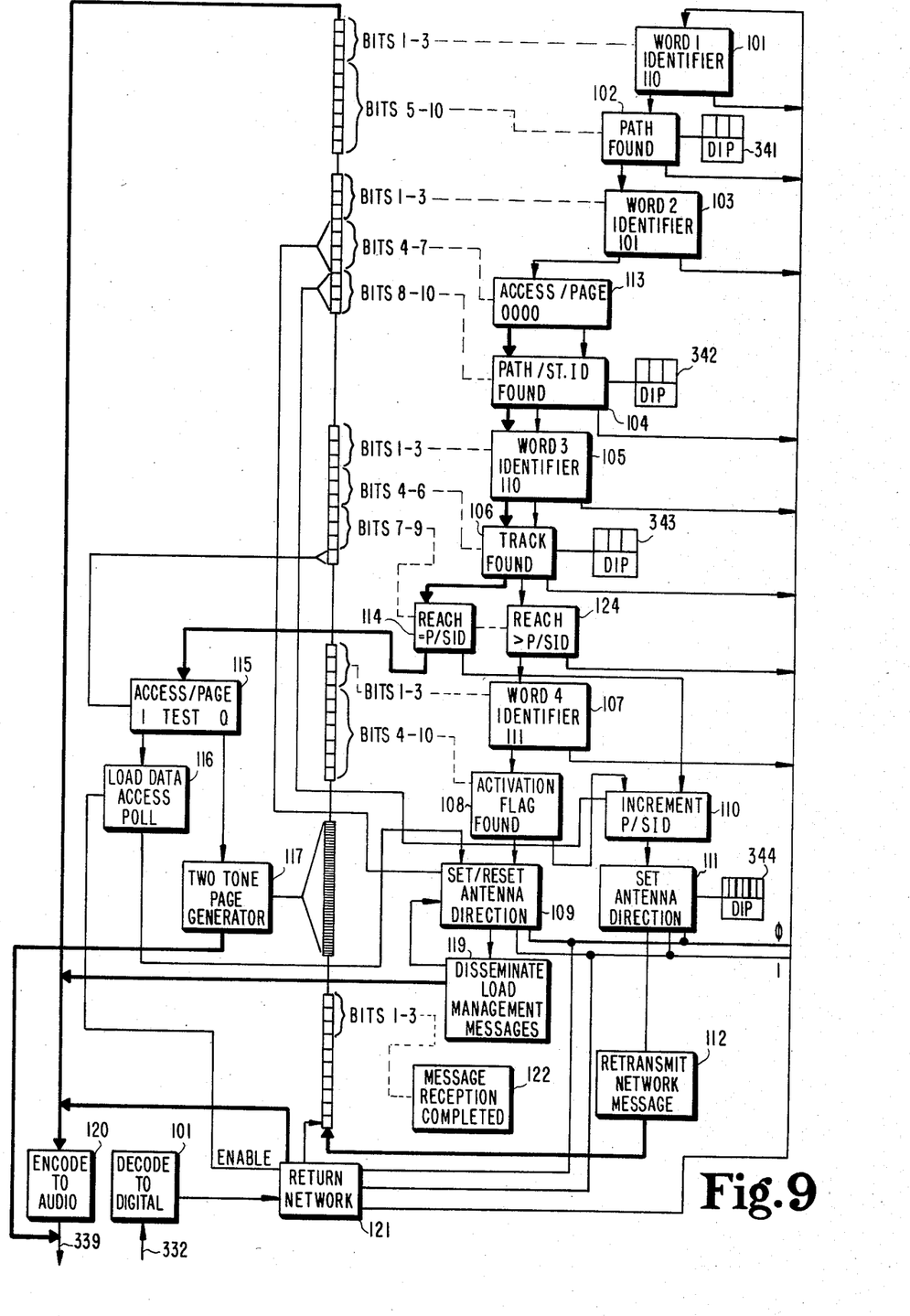
FIG. 9 illustrates the manner in which digital encoder/decoder processes digital messages transmitted in the retransmission network.

FIG. 9 illustrates the above described operation of digital decoder/encoder 333 of FIG. 4 as it processes received messages (line 332). The preferred source code for digital decoder/encoder 333 is attached hereto as Exhibit B. Retransmission stations in the retransmission network directionally retransmit load management messages (i.e. data words in FIGS. 7A-B) within the retransmission network. The load management messages include (1)load control messages, (2) data acquisition command messages, (3) load data messages, and (4) paging signals. These load management messages are "carried" though the retransmission network by retransmission network messages which contain the group of 5 control words mentioned above and illustrated in FIGS. 8A-E. When appropriately signalled, a retransmission station disseminates the "carried" load management messages to the target load controllers, power load monitors, and/or remote paging units.

The first control word to be received by retransmission stations is a path address word (FIG. 8A). A data word is identified as a path address word by having the binary number 100 in its first three bits (box 101). Retransmission stations require that the first word that it decodes be a path address word. If the first word decoded is not a path address word, it will be ignored. If the first word decoded is a path address word, the contents of the path bits are compared (box 102)to the path address for that particular retransmission station (dip switch package 341). If the path address received does not match the stored path address, then further decoding is discontinued until a new path address word is received. If the address matches the data stored in the dip switch package 341, then decoding continues.

The second control word (direction and path/station identifier—see FIG. 8B) is identified by a binary 101 in its first three bits. Retransmission stations require the second word decoded to be a direction and path/station identifier word (box 103). If the second word decoded is not a direction and path/station identifier word, the retransmission station will abort the sequence and discontinue further decoding until a new path address word is received. If the second word decoded is a direction and path/station identifier word, the contents of the path/station identifier bits are compared (box 104) to the path/station identifier address coded into the receiving retransmission station (dip switch package 342). If the identifier addresses do not match, further decoding is discontinued until a new path address word is received. If the addresses do match, decoding continues.

The third control word is a track and reach control word (FIG. 8C). The track and reach control word is identified by a binary 110 in its first three bits. The following data bits include track selection bits and reach bits. A receiving retransmission station requires that the third word decoded be identified as a track and reach word (box 105). If the third word decoded is not a track and reach word, further decoding is discontinued until a new path word is received. If the third word decoded is a track and reach word, the receiving retransmission station compares (box 106) the track select bits with the preprogrammed track switches of the receiving retransmission unit (dip switch package 343). If the receiving retransmission station is not a member of the track selected by the third control word, then the sequence is aborted. Otherwise, decoding continues. A comparison is also made between the reach bits of the third control word and the path/station identifier address coded into the receiving retransmission station (dip switch package 342). The reach signal indicates how far out into the retransmission network a message is to be carried. If the signalled reach is less than the path/station identifier address of the receiving retransmission station, there is no need for further processing, and the sequence is aborted.

The fourth control word (activation signals—see FIG. 8D) is identified by a 111 as its first three bits (box 107). The remaining bits identify which retransmission stations in the chain are to be used to disperse the load control data and which retransmission stations are to forward load control data to other retransmission stations (box 108). Bits 4 through 10 correspond to identification addresses 1 through 7 respectively (dip switch package 342). A one in an activation bit signifies that the corresponding retransmission station with the corresponding identification address (dip switch package 342) is to disperse the load control data to the addressable, remotely controlled loads in its region. The directions of such transmissions is controlled by the data transmitted in the direction select portion of the second control word (FIG. 8B), with a binary one in any of the bit locations signifying that the directional antenna corresponding to that bit location to be activated for retransmission (box 109). The carried load management messages are then disseminated (box 119). That is, they are encoded into audio (box 120) and sent to receiver/transmitter 331 for dissemination to the targeted load controllers, and/or power load monitors (line 339).

A zero in the activation bit location corresponding to the identification address signifies that the retransmission station is merely to retransmit the received message to the next station in the chain. In this event, a one is added to the path/station identifier portion of the second control word so that the next retransmission station in the chain can properly identify its signal box (110).

Data acquisition is performed in the following manner: A binary 0000 in the direction select portion of the second control word (box 113) and a 1 in test bit of the third control word (box 115) signify that data acquisition is to be performed. When a data acquisition request is made, the retransmission station which is to actually perform the data acquisition is the last station in the chain, thus a comparison of the reach portion of the third control word (FIG. 8C) and the identification address portion of the second control word (FIG. 8B) reveals whether the receiving station is to perform the data acquisition or merely to retransmit the request along the chain (114). Multiple load data acquisition monitors can be accessed by a single retransmission station. Access is determined by activation control word (FIG. 8D) with the activation bits signifying which of a selected number of load data acquisition monitors are to be polled (box 116).

When data acquisition is being performed, the data generated by the accessed load monitor is carried via the retransmission network back to central controller. In this event, return network 121 is enabled which maintains the connection of the activated antenna for reception of the returning signal. Upon receipt of the returning transmission, the initializing antenna is connected (i.e. the antenna which is connected to monitor transmissions emanating from central controller 200), and the returning message is retransmitted back toward central controller. This function is repeatedly performed by each station in the track until the returning signal is ultimately received by central controller 200. It is to be noted that although the return network has been described only in terms of data acquisition, it may also be used to verify load command and paging dissmination. The verification bit of control word 1 shown in FIG. 8A is available for this purpose.

In addition to carrying load control and data acquisition messages, the retransmission network operates to page remote paging units. A binary 0000 in the direction select portion of the second control word (box 113) and a 0 in test bit of the third control word (box 115) signify that paging is to be performed by the last retransmission station in the transmission chain. As with the data acquisition mode, a retransmission station determines its function in the chain by a comparison between the path/station identifier portion of the second control word and the reach portion of the third control word (box 114). Where dispersion is indicated, the data words are retransmitted as a two tone sequential frequency transmission, which is the commonly used format for a paging signal (box 117).

The reception of the fifth and final control word (FIG.8E) signifies that a complete retransmission network message has been received box (122).

Figure 10:
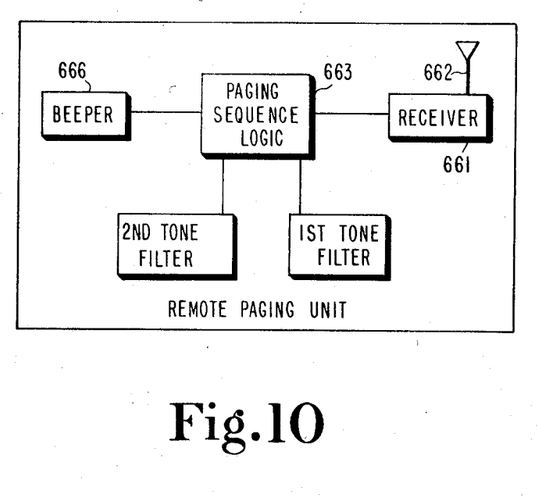
FIG. 10 a diagram of a remote paging unit of FIGS. 1 and 2.

FIG. 10 is a diagram of remote paging unit P6 as an example of one of the remote paging units in the retransmission network. Receiver 661 receives radio transmissions through antenna 662. Paging sequence logic 663 compares received transmissions to a pre-programmed address in a two tone sequential format, accessing 1st tone filter 664, and when it is appropriately received, further accessing 2 and tone filter 665. Paging sequence logic then activates audio beeper 666 when paging unit P6 has been appropriately addressed.

The operation of individual components within the system having been heretofor described, examples of the system operation in the control of selected remote loads, in the accessing of load data, and in the paging remote paging units, will now be given.

Say that addressably controllable load 21 is to be disconnected from power generating source 115. Central controller 200 generates a retransmission network message carrying a load management message which addresses and commands the disconnection of load 21. The retransmission network message signals itself to be carried along path 1 (control word 1) to path/station 1 (word 2), along track 1 (word 3). The network message is to reach path/station 2 (word 3) and path/station 2 is to be activated (word 4) to disseminate the carried load management message in direction 3 (word 2).

The generated message is received and processed by retransmission station R1. No other unit will act in response to the initial generated message as no other unit has been pre-coded with all the identifying data of that message. Upon processing of the network message, retransmission station R1 (1) ascertains that it is not to be activated for dissemination, (2) adds one to the path/station identifier to signify that the second station in path 1, track 1 is to receives its retransmitted message, (3) connects its first antenna (dip 344) as the direction in which the message is to be sent, and (4) retransmits the retransmission message.

This retransmission is received by retransmission station R2. Upon processing of the retransmitted message, retransmission station R2 (1) ascertains that it is to be activated for dissemination, (2) connects the third directional antenna as indicated by the received message, and (3) disseminates the load management message which was carried by the retransmission network message. This transmission is received by remote load controller 21, which detects its address and responds to the command by disconnecting its load.

Say that power load data is to be accessed from load monitor M6. Central controller 200 generates a retransmission network message carrying a load management message which addresses load monitor M6. The retransmission network message signals itself to be carried along path 2 (control word 1) to path/station 1 (word 2), along track 1 (word 3). The network message is to reach path/station 1 (word 3) and path/station 1 which is to disseminate the data acquisition request to load monitor M6 (word 4).

The generated message is received and processed by retransmission station R6. Upon processing of the network message, retransmission station R6 (1) ascertains that it is to be activated for dissemination and data access, (2) connects the antenna for accessing monitor M6, (3) disseminates the load management message which was carried by the retransmission network message. This transmission is received by monitor M6, which detects its address and responds by transmitting a load data message. This load data message is received by station R6 which retransmits the load data back to central controller 200.

Lastly, say that remote paging unit P3 is to be paged. Central controller 200 generates a retransmission network message carrying a load management message which addresses paging unit P3. The retransmission network message signals itself to be carried along path 1 (control word 1) to path/station 2 (word 2), along track 2 (word 3). The network message is to reach path/station 2 (word 3) which is to disseminate the page to paging unit P3 (word 4).

The generated message is received and processed by retransmission station R1. Upon processing of the network message, retransmission station R1 (1) ascertains that it is not to be activated for dissemination, (2) adds one to the path/station identifier to signify that the second station in path 1, track 2 is to receive its retransmitted message, (3) connects its second antenna (dip 344) as the direction in which the message is to be sent, and (4) retransmits the retransmission message.

This retransmission is received by retransmission station R4. Upon processing of the retransmitted message, retransmission station R4 (1) ascertains that it is to be activated for dissemination of a paging signal, and (2) generates and disseminates a two tone sequential signal which addresses paging unit P3. This transmission is received by paging unit P3, which detects its address and responds by sounding a paging signal.

While there have been described above the principles of this invention in connection with specific apparatus and techniques, it is to be clearly understood that this description is made only by way of an example and not as a limitation to the scope of the invention.

The invention claimed is:

1. A remote load data acquisition and control system for a power network, the power network including a power generating source and a plurality of separately controllable loads, said system comprising:
   (a) a plurality of addressable remote load controllers, at least some of said addressable load controllers including:
      (1) radio receiver means;
      (2) decoder means for decoding radio transmissions received into digital messages;
      (3) an address identifier; and
      (4) means for connecting and disconnecting a load to and from the power generating source in response to received commands when the load controller receives and decodes the address identifier of that load controller;

(b) a plurality of addressable power load monitors, at least some of said addressable power load monitors including:
  (1) radio receiver means;
  (2) decoder means for decoding received radio transmissions into digital messages;
  (3) an address identifier;
  (4) load sensing means for sensing the extent of load on the power network at a point in the power network;
  (5) means for accessing said load sensing means and generating digital load data messages indicating the extent of load on the power network at a point in the power network when the power load monitor receives and decodes the address identifier of that power load monitor;
  (6) means for encoding and transmitting said load data messages;

(c) a central controller, said central controller including:
  (1) central controller processor means for processing power load data and generating digital messages, said central controller generated digital messages including retransmission network messages and load management messages, said load management messages including
    (i) load control messages which address said addressable remote controllers and command the selective connection and disconnection of loads connected to addressed remote load controllers, and
    (ii) data aquisition messages which address power load monitors;
  (2) central radio frequency transmitter means for transmitting said digital messages; and
  (3) central controller receiver means for receiving power load data messages;

(d) a network of retransmission stations, said retransmission stations including:
  (1) receiver means for receiving radio transmissions;
  (2) a radio frequency transmitter;
  (3) decoder means for decoding radio transmissions received into digital messages;
  (4) a plurality of directional antennas connectable to said receiver and transmitter means; and
  (5) retransmission network processing means for processing received retransmission network messages, said retransmission network processing means including:
    (i) means for selectively retransmitting received radio transmissions within said retransmission network in response to received retransmission network messages;
    (ii) means for selectively retransmitting received load control messages in response to other received retransmission network messages; and
    (iii) means for selectively retransmitting received data acquisition messages in response to yet other received retransmission network messages;
    (iv) means for retransmitting received load data messages within said retransmission network toward said central controller receiver means; and
    (v) means for selectively controlling the connection and disconnection of said directional antennas to said receiver and transmitter means in response to certain retransmission network messages.

2. The remote load data acquisition and control system for a power network of claim 1, additionally including a plurality of remote paging units, said remote paging units including:
  (1) radio receiver means;
  (2) an address identifier; and
  (3) signalling means for signalling a paging signal in response to received remote paging messages which include the address identifier of that remote paging unit;
in which said load management messages additionally includes remote paging messages which address remote paging units; and in which said retransmission network processing means includes means for selectively retransmitting received remote paging messages in response to certain received retransmission network messages.

3. A remote load data acquisition and control system for a power network, the power network including a power generating source and a plurality of separately controllable loads, said system comprising:
  (a) a central controller, said central controller including:
    (1) central processor means for processing power network load data and generating digital messages to address loads in the power system and to command the connection and disconnection of addressed loads to and from the power generating source;
    (2) central radio frequency transmitter means for transmitting said digital messages; and
    (3) central controller receiver means for receiving radio frequency messages;
  (b) a plurality of addressable remote load controllers, each of said addressable load controllers including:
    (1) radio receiver means;
    (2) decoder means for decoding radio transmissions received into digital messages;
    (3) an address identifier; and
    (4) means for connecting and disconnecting a load to and from the power generating source in response to command messages when the load controller receives and decodes the address identifier of that load controller;
  (c) at least one load sensing means for sensing the load on the power network at a point in the power network remote from said central controller, said load sensing means including means for generating digital load data messages indicating the extent of load on the power network at a point in the power network;
  (d) a network of retransmission stations, said retransmission station including:
    (1) receiver means for receiving radio transmissions;
    (2) a radio frequency transmitter;
    (3) decoder means for decoding radio transmissions recieved into digital messages;
    (4) a plurality of directional antennas connectable to said receiver and transmitter means; and
    (5) retransmission network processing means for means for selectively retransmitting received radio transmissions within said retransmission network, said retransmission network processing means including means for selectively controlling the connection and disconnection of said directional antennas to said receiver and transmitter means in response to certain received digital message;

(6) means for selectively transmitting addressed command messages to at least one of said addressably remote load controllers;

(7) data acquisition means for receiving load data messages from one of said load sensing means; and (8) means for transmitting load data messages received from one of said load sensing means, said load data messages being receivable by said controller receiver means.

4. The remote load data acquisition and control system for a power network of claim 3, in which at least some of said retransmission stations include a plurality of directional antennas connectable to said receiver and transmitter means; and in which at least some of said retransmission stations include means for selectively controlling the connection of said directional antennas in response to certain received digital messages.

5. The remote load data acquisition and control system for a power network of claim 3, additionally including a plurality of remote paging units, said remote paging units including:

(1) radio receiver means;

(2) an address identifier; and (3) signalling means for signalling a paging signal in response to received messages which include the address identifier of that remote paging unit;

and in which at least some of said retransmission network stations include means for selectively transmitting the address identifier of a remote paging unit.

* * * * *